US005970840A

United States Patent [19]

Yan et al.

[11] Patent Number: 5,970,840

[45] Date of Patent: Oct. 26, 1999

[54] METHOD AND APPARATUS FOR ADJUSTING A GAUGE PLATE OF A FOOD SLICER AND A FASTENER THEREFOR

[75] Inventors: Gongpu Yan, Troy; Ellis Gale Short, Sidney; Timothy Allen Schrand, Waynesville, all of Ohio; Richard Paul Scherch, Fort Myers, Fla.

[73] Assignee: Premark FEG L.L.C., Wilmington, Del.

[21] Appl. No.: 08/915,200

[22] Filed: Aug. 15, 1997

Related U.S. Application Data

[60] Provisional application No. 60/023,668, Aug. 15, 1996.

[51] Int. Cl.[6] .............................. B23D 19/00; B26D 7/06

[52] U.S. Cl. .............................. 83/717; 83/421; 83/468.7

[58] Field of Search .............................. 83/468.7, 717, 83/421, 915.5

[56] References Cited

U.S. PATENT DOCUMENTS

| | | |
|---|---|---|
| 259,883 | 7/1882 | Engebretsen . |
| 1,972,254 | 1/1934 | Wood . |
| 1,993,849 | 3/1935 | Lucey . |
| 2,004,603 | 6/1935 | Folk . |
| 2,086,759 | 7/1937 | Wood . |
| 2,563,539 | 10/1951 | Van Duyn . |
| 2,573,630 | 10/1951 | Van Duyn . |
| 2,598,740 | 6/1952 | Zimmermann . |
| 2,663,341 | 12/1953 | Grove . |
| 2,682,289 | 6/1954 | Brown . |
| 2,691,398 | 10/1954 | Klingens . |
| 2,822,011 | 2/1958 | Lundell . |
| 2,970,625 | 3/1961 | Lundell . |
| 3,051,207 | 8/1962 | Hartley . |
| 3,613,754 | 10/1971 | Harley . |
| 3,672,420 | 6/1972 | Harley et al. . |
| 3,704,736 | 12/1972 | Pratley . |
| 3,857,310 | 12/1974 | Tiby . |
| 3,958,478 | 5/1976 | Camper . |
| 3,986,304 | 10/1976 | Shie, III . |
| 4,227,656 | 10/1980 | Engebretsen . |
| 4,397,206 | 8/1983 | Czala . |
| 4,434,694 | 3/1984 | Scharsig . |
| 4,813,316 | 3/1989 | Johnson et al. . |
| 5,101,704 | 4/1992 | Jones et al. . |
| 5,148,729 | 9/1992 | Krumdieck . |
| 5,188,011 | 2/1993 | Somal et al. . |
| 5,224,407 | 7/1993 | Koch et al. . |
| 5,509,337 | 4/1996 | Norman et al. . |
| 5,666,866 | 9/1997 | Huang et al. . |
| 5,687,626 | 11/1997 | Scherch et al. . |

*Primary Examiner*—M. Rachuba
*Assistant Examiner*—Sean Pryor
*Attorney, Agent, or Firm*—Thompson Hine & Flory LLP

[57] ABSTRACT

An adjustable gauge plate for a food slicer comprising a front plate and a rear plate attached to the front plate, such that a cavity is defined between the plates, the rear plate having at least one hole therethrough. The gauge plate further comprises an indexing member attached to a slicer base, an adjustment plate mounted to the indexing member, the indexing member and adjustment plate being shaped to fit in the cavity between the front and rear plates, and a fastener shaped to be inserted in the hole in the rear plate and adjustably connected to the adjustment plate such that the gauge plate is capable of being adjusted relative to the adjustment plate and the gauge plate is capable of being adjusted relative to the food slicer.

9 Claims, 5 Drawing Sheets

METHOD AND APPARATUS FOR ADJUSTING A GAUGE PLATE OF A FOOD SLICER AND A FASTENER THEREFOR

CROSS REFERENCE TO RELATED APPLICATIONS

This application claims benefit of U.S. Provisional Application No. 60/023,668, filed Aug. 15, 1996.

BACKGROUND OF THE INVENTION

The present invention relates to a means for adjusting the gauge plate of a food product slicer relative to the blade, and a method therefore, and more particularly, this invention relates to an adjustment member which gives the gauge plate a plurality of degrees of movement to align the gauge plate with the slicing blade. Further, the invention relates to a means of attaching the two portions of the gauge plate.

Typical reciprocating food slicers have a rotatable, circular or disc-like slicing blade, a gauge plate for determining the thickness of the slice and a carriage for supporting the food as it is moved past the cutting edge of the knife during slicing.

The gauge plate is situated along one edge of the knife. It is laterally movable with respect to the knife for determining the thickness of the slices to be cut. The gauge plate is mounted on the base of the slicer parallel to the face of the knife.

In assembling the slicer, it is necessary to align the gauge plate with the rotary knife such that the knife edge is flush with or slightly recessed from the surface of the gauge plate when the gauge plate is closed. This invention provides a construction which facilitates this assembly as well as its adjustments during use.

In conventional slicers, the portions of the gauge plate were connected to each other by means of screws. Therefore, holes were required to be drilled in all portions of the plate. This is disadvantageous since food particles can get lodged in the holes and the crevices created by the screws in the holes. In order to solve this problem sometimes caps were placed over the holes to prevent contamination.

SUMMARY OF THE INVENTION

The present invention is an adjustable gauge plate for a food slicer, a method for adjusting its position and a means of attaching the two portions. In a preferred embodiment of the invention, the gauge plate includes an adjustment plate on an indexing rod which sits within the gauge plate. The gauge plate includes adjustment means which allow adjustment of the gauge plate relative to the adjustment plate. Further, the invention preferably includes two elliptical holes and four set screws which are individually adjustable to adjust the gauge plate relative to the slicing blade.

It is a further object of the invention to provide an adjustable gauge plate for a food slicer comprising a front plate and a rear plate attached to the front plate, such that a cavity is defined between the plates. The rear plate includes at least one hole therethrough. The gauge plate includes an indexing member attached to a slicer base and an adjustment plate mounted to the indexing member. The indexing member and adjustment plate are shaped to fit in the cavity between the front and rear plates; and a fastener is shaped to be inserted in the hole in the rear plate and is adjustably connected to the adjustment plate such that the gauge plate is capable of being adjusted relative to the adjustment plate and the gauge plate is capable of being adjusted relative to the food slicer.

It is a further object of the invention to provide a method of adjusting a gauge plate of a food slicer relative to a slicing blade comprising the steps of providing a gauge plate including a front plate and rear plate attached to the front plate, so as to define a cavity therebetween, mounting an index rod to the food slicer; attaching an adjustment plate to the indexing rod; inserting the adjustment plate and a portion of the indexing rod into the cavity in the gauge plate; adjusting a position of the gauge plate with respect to the adjustment plate such that the front plate of the gauge plate is substantially parallel to the slicing blade; fastening the adjustment plate to the gauge plate with fasteners; further adjusting the gauge plate with respect to the adjustment plate; and tightening the fasteners.

It is yet a further object of the present invention to provide a gauge plate for a food slicer comprising a first plate; a second plate having a periphery which is a substantial mirror image to a periphery of the first plate; a plurality of stud fasteners mounted to the periphery of the first plate; a plurality of bosses mounted to the periphery of the second plate, such that the position of the bosses corresponds to the position of the studs fasteners, wherein the first and second plates are capable of being connected such that the plates are securely attached to one another and a cavity is created between the first and second plates.

Other objects and advantages of the present invention will be apparent from the following description, the accompanying drawings and the appended claims.

DETAILED DESCRIPTION

Figure 1:
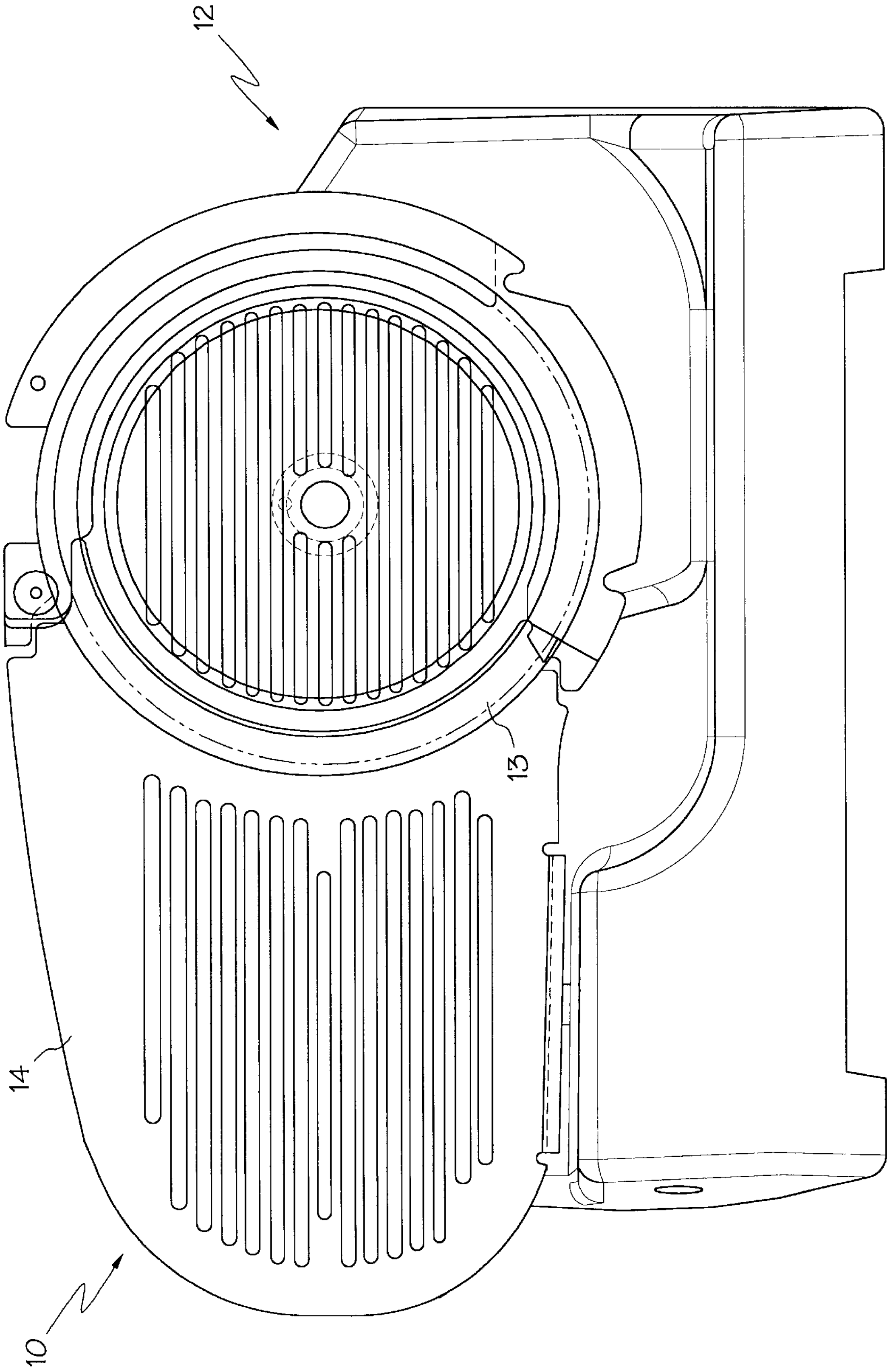
FIG. 1 shows a gauge plate of the present invention mounted on a food slicer.

A gauge plate for a reciprocating food product slicer, generally designated 10, in accordance with the present invention is shown in FIG. 1 as attached to the slicer 12 having a slicer blade 13. The gauge plate 10 includes a front plate 14 as shown in FIG. 1 and a rear plate 16 as shown in FIG. 2.

Figure 2:
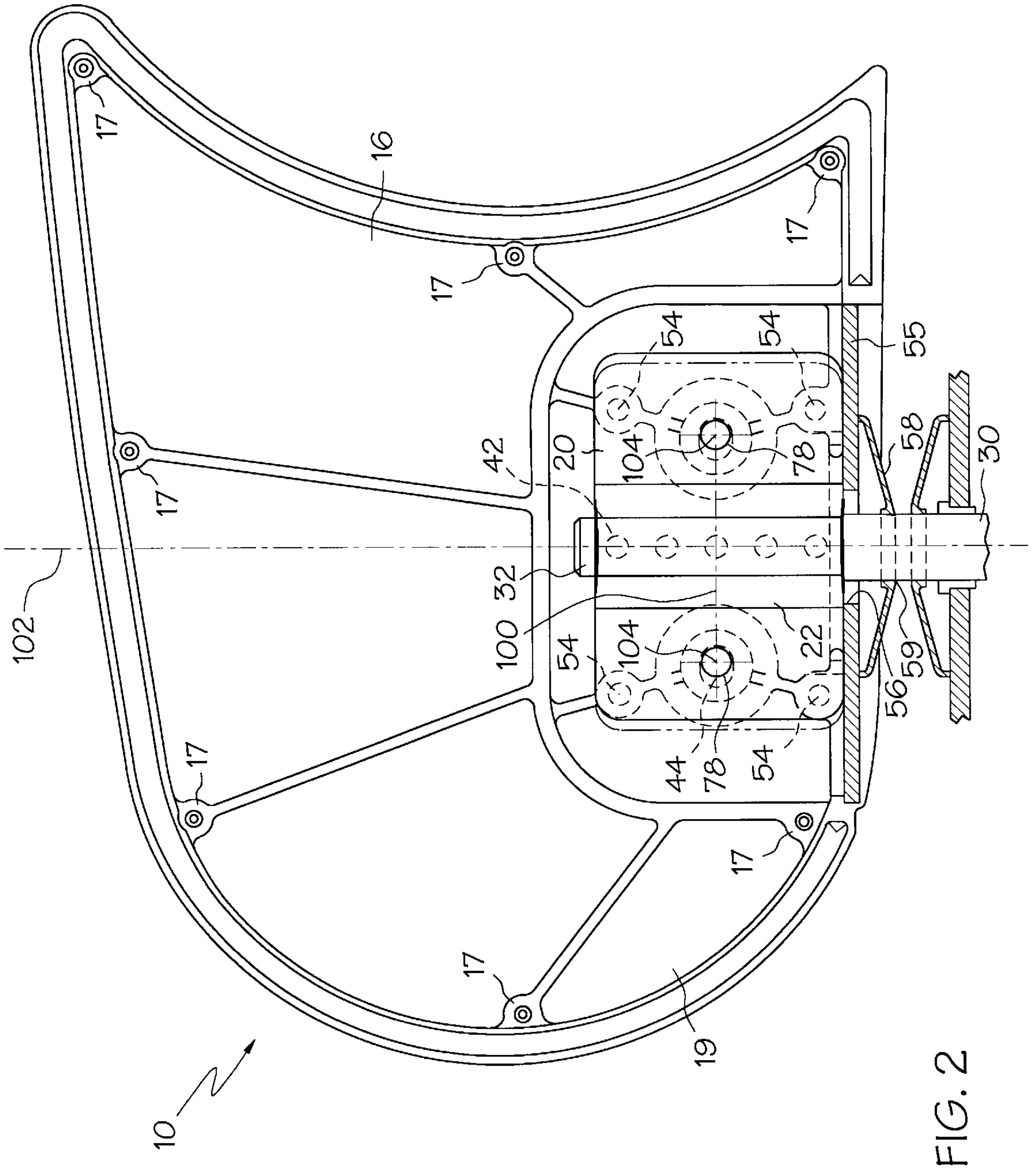
FIG. 2 shows the gauge plate of FIG. 1 with the front plate removed.

The shape of the rear plate 16 shown in FIG. 2, is a substantial mirror image to the front plate 14 shown in FIG. 1. The gauge plate 10 includes a plurality of fasteners around the circumference thereof. Preferably the fasteners are studs (not shown) which extend from either plate 14 or 16 substantially perpendicular to the plane of the gauge plate. Associated bosses 17 extend from the opposite plate such that the bosses are shaped to receive the studs. Seven bosses are shown here, but any number may be used which will adequately hold the two plates 14 and 16 together. The bosses 17 correspond to the positioning of the studs such that the studs can be inserted into the bosses 17. The studs are slightly larger in diameter than the holes in the bosses 17 such that the plates are held together in a press-fit.

The gauge plate 10 is described as being attached with studs which are press-fit into holes. However, one will understand that other fasteners such as screws could be used to hold the two plates of the gauge together without deviating from the scope of the invention. A polyurethane seal may be formed between the front 14 and rear 16 plates so as to seal the gauge plate 10 from any juices or other food contaminants.

Figure 3:
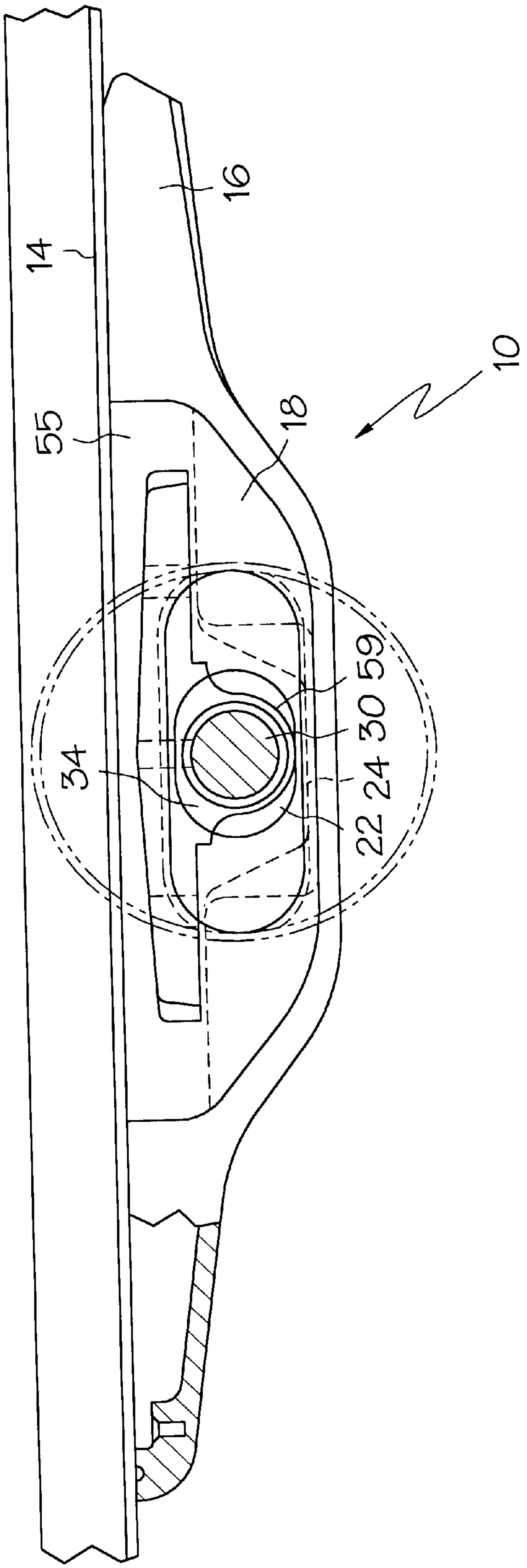
FIG. 3 shows a cross-sectional view of the gauge plate of FIG. 1.

The rear plate 16 of the gauge plate 10 is concave as shown in FIG. 3, so that when the front 14 and rear 16 plates are put together they define a cavity 18 there between and an opening on the bottom of the gauge plate leading to the cavity. The gauge plate 10 is removably mounted on the slicer 12 by means of an adjustment plate 20, which is mounted to the slicer base 12 and fits in the cavity 18 between the front 14 and rear 16 plates.

Figure 4:
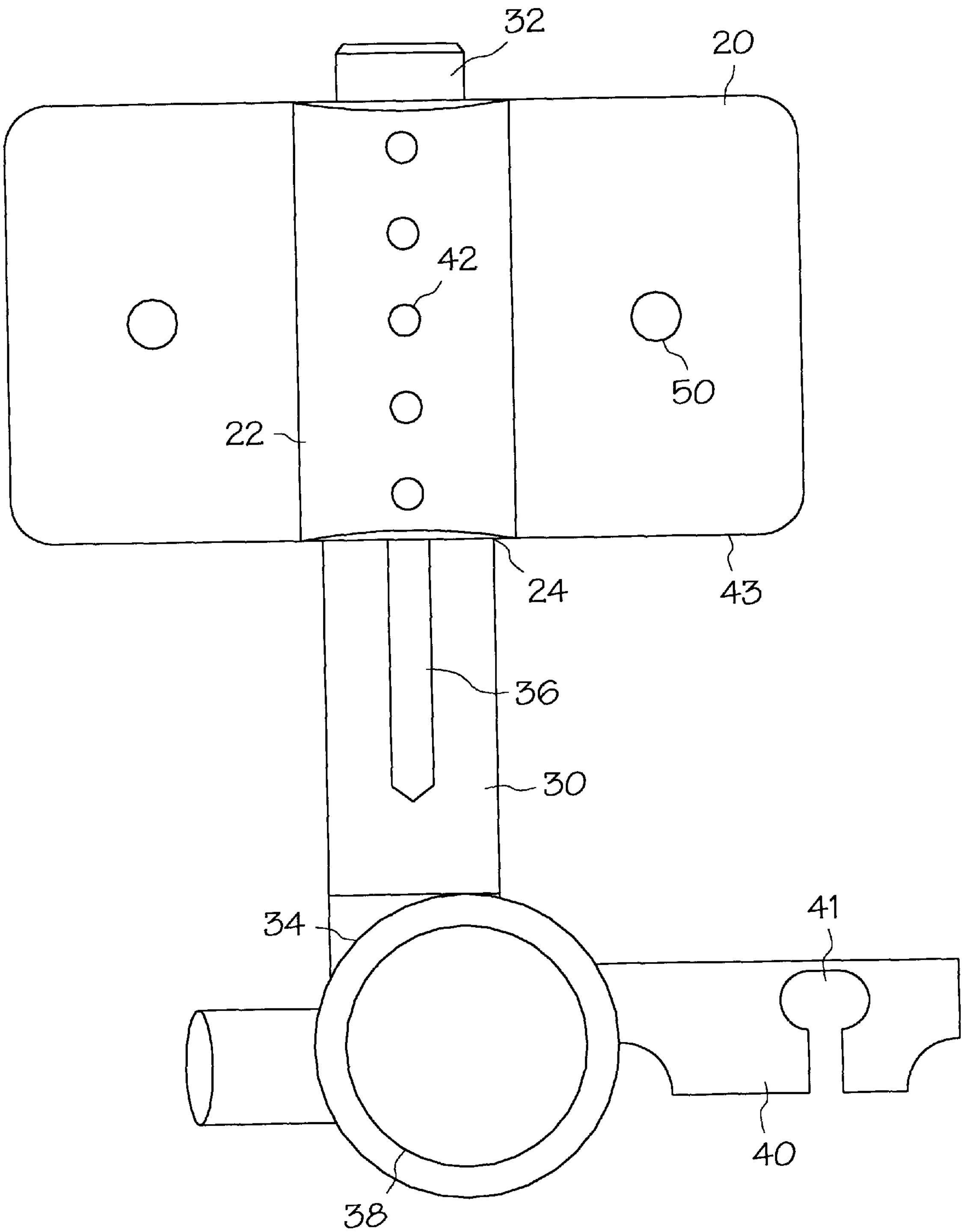
FIG. 4 shows the adjustment plate and indexing rod of the present invention.

The slicer includes an indexing rod 30 (FIG. 4) which is attached on a first end 32 to the adjustment plate 20 and to the indexing mechanism (not shown) of the slicer base on its second end 34. The indexing mechanism is conventional, and adjusts the position of the gauge plate 10 relative to the slicer blade 13 for the desired thickness of cut of the food product. As shown in FIG. 4, rod 30 is substantially cylindrical in shape and has a groove 36 therein. The terminal end 34 of the rod includes a cylindrical boss 38 and an extending projection 40 having a slotted hole 41 for mounting the indexing rod 30 to the gauge plate adjustment mechanism.

The adjustment plate 20 as shown in FIG. 4, is made of any sturdy material, such as cast aluminum. It is generally rectangular in shape and includes a sleeve 22 on the back thereof. The sleeve 22 is integral with the rectangular portion and includes a bore 24 down its length for insertion of the indexing rod 30.

The adjustment plate 20 further includes a plurality of holes 42 on the sleeve 22 which are aligned with the groove 36 in the indexing rod such that when the indexing rod 30 is inserted in the sleeve 22, a plurality of screws inserted in the holes 42 can be tightened down into the groove 36 and "lock" the adjustment plate 20 in a fixed manner relative to the rod 30.

The adjustment plate 20 also includes two through threaded holes 50, one on either side of the sleeve. These holes should be at the same distance from the top edge 43 of the plate 20.

As shown in FIG. 2, the lower portion 19 of the rear plate 16 of the gauge plate is also provided with two elongated, e.g. elliptical slots 44 which align with the through holes 50 of the adjustment plate 20 as will be described hereinbelow, and four small holes 54 which are positioned one above and one below each of the elliptical slots 44 for insertion of four set screws (not shown). These smaller holes 54 will align with the four corners of the adjustment plate within the gauge plate.

As shown in FIG. 3 a flat plate 55 is mounted to the bottom of the gauge plate 10. This seals the gauge plate so that it is more difficult for food, juices, or other contaminants to get inside the gauge plate. The flat plate 55 includes an elongate slot 56 therein for the adjustment plate 20 to slide as the gauge plate is adjusted relative to the slicer base. In addition, FIG. 2 shows an oblong cup 58 which is press-fit onto the indexing rod 30. It acts to seal off the slot 56 as well as providing support for the flat plate 55. The oblong cup 58 has a hole 59 in the center thereof for insertion of the indexing rod 30.

The indexing rod 30 is fixed to the slicer 12 and the adjustment plate 20 is fixed by means of screws passed through the holes 42 to the rod 30. The front 14 and rear plates 16 are sealed together so that there is a bottom opening leading to the cavity 18 and the gauge plate 10 is adjustably mounted over the adjustment plate 20 and attached by threaded fasteners.

The two bolt holes 50 through the width of the adjustment plate 20 are threaded. Thereby, when the adjustment plate is inserted in the cavity 18 between the two plates 14, 16 of the gauge plate, the two holes 50 align with the elliptical holes 44 in the plate 16.

The front plate 14 of the gauge plate should be adjusted to be substantially parallel to the slicing blade 13 such that when the indexing member is in the zero position, the front face of the gauge plate is flush with, or preferably approximately 0.020 inches from, the knife edge. To adjust the position of the gauge plate with respect to the adjustment plate, the bolts 78 are slid within the elliptical slots 44.

To align the front face 14 of the gauge plate with the knife edge, a set of fasteners (bolts) are first loosely inserted through gauge plate slots 44 into adjustment plate holes 50. Then a straight edge is held against the slicer blade 13 and the front plate 14. The gauge plate is then slidably adjusted by means of moving the elliptical slots 44 with respect to the bolts. The faces of the blade and gauge plate are substantially aligned by adjusting the set screws located in the holes 54, after which the bolts in the slots 44 are tightened. To adjust for any deviation in the pitch, yaw or planar alignment of the gauge plate 10 with respect to the slicer blade 13, four set screws are provided through holes 54 in the back plate 16 of the gauge plate 10. The set screws abut the face of the adjustment plate 20 near the corners thereof. Since the gauge plate has been fixed to the adjustment plate by means of the bolts 78 selective adjustment of the individual set screws will move or tilt that quadrant of the adjustment plate and thus the gauge plate in a forward or backward direction with respect to the knife. After the set screws are fixed, the fasteners in the slots 44 are securely tightened.

When the bolts are loosened, the gauge plate 10 may be moved toward or away from the blade 13 (left or right as the slicer is shown in FIG. 1 or linearly along the lateral axis 100 shown in FIG. 2), up and down (as the slicer is shown in FIG. 1 or linearly along the axis 102 of the indexing member 30 shown in FIG. 2), as well as toward or away from the operator by adjusting each of the set screws which are inserted in holes 54 and abut against the adjustment plate 20 (in or out of the page as the slicer is shown in FIG. 1 or linearly along the axis 104, into or out of the drawing page as defined by the fasteners shown in FIG. 2). Furthermore, the gauge plate may be rotated with three degrees of freedom, thereby providing a total of six degrees of freedom about each of the axes 100, 102, and 104 by adjustment of the set screws in holes 54 and by movement of the adjustment plate 20 while the bolts 78 are loosened of movement for the gauge plate.

Since the bolt holes 44 on the gauge plate 10 are elliptical, the entire gauge plate may be adjusted with respect to the adjustment plate when the bolts are loosened by shifting the gauge plate to either side, up or down. This is especially useful since, as the blade wears, it becomes slightly smaller and the gauge plate can be moved laterally inward with respect to the knife edge to close any gap that may develop over time. The four set screws in holes 54 provide the gauge plate with several additional degrees of movement.

Figure 5:
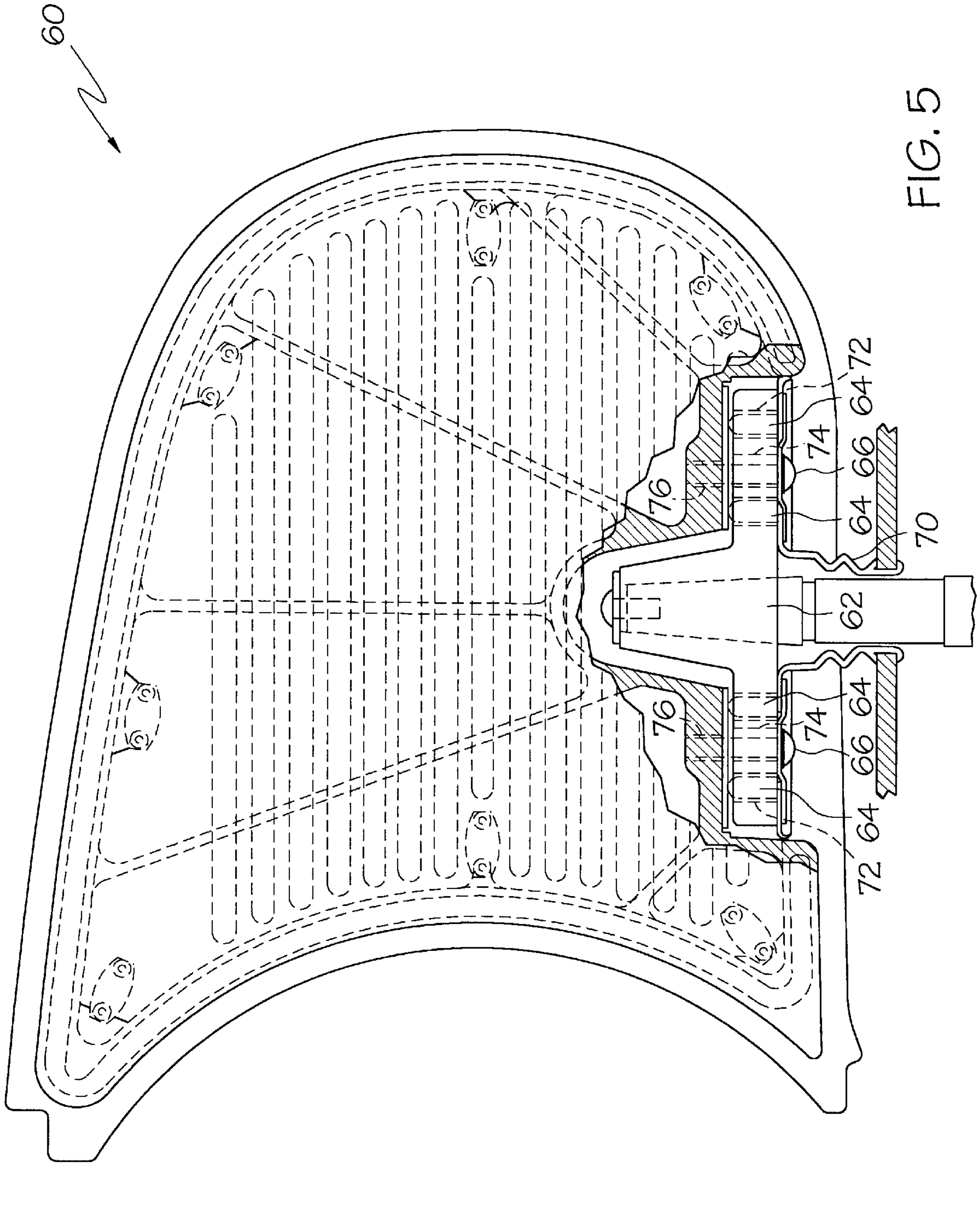
FIG. 5 shows an alternative adjustable gauge plate of the present invention.

An alternative adjustment means for the gauge plate 60 is shown in FIG. 5. In this embodiment, the rectangular adjustment plate 20 of FIG. 2 is replaced by a T-shaped member 62. This T-shaped member mounts to the slicer on a bracket. The T-shaped-member includes four set screws 64 in respective holes 72 in T-shaped plate 62 and two bolts 66 through respective slots 74 in T-shaped plate and threaded in holes 76 of the gauge plate similar to the embodiment shown in FIG. 2. However, these fasteners are adjusted on the bottom of the plate in the hole to the cavity 18 instead of on the back of the plate as in the previous embodiment. Additionally, a flexible rubber shield 70 can be used to prevent food debris and juices from contacting the T-shaped adjustment member or contaminating inside of the gauge plate.

In summary, by using the adjustment means and methods of the present invention, adjustments may be made to the gauge plate relative to the slicer blade in any or all of the following manners:

(1) by movement of the indexing member, the gauge plate may be moved in a parallel relationship to the blade;

(2) by loosening the bolts, the gauge plate may be moved toward or away from the blade; and (3) by alternatively loosening and tightening the four set screws the pitch and yaw of the gauge plate can be adjusted, as well as the translational and rotational movement.

Having described the invention in detail and by to reference to preferred embodiments thereof, it will be apparent that modifications and variations are possible without departing from the scope of the invention.

What is claimed is:

1. A food slicer gauge plate assembly adjustable in six degrees of freedom defined relative to first, second and third axes, comprising:

a gauge plate comprising a front plate and a rear plate, said rear plate attached to said front plate to form a cavity between said plates, said rear plate having first, second, third, and fourth holes therethrough and at least one slot therethrough;

an indexing member attached to a food slicer base;

an adjustment plate mounted to said indexing member, said adjustment plate positioned within said cavity, at least one hole formed in said adjustment plate and aligned with said rear plate slot;

at least one fastener positioned through said rear plate slot and said adjustment plate hole for securing said gauge plate to said adjustment plate when tightened and for permitting said gauge plate to move linearly along the first axis and the second axis and rotationally about the third axis when loosened;

first, second, third, and fourth threaded members positioned through said first, second, third, and fourth rear plate holes respectively and each abutting against said adjustment plate;

wherein adjustment of said threaded members adjusts a linear position of said gauge plate along the third axis and also adjusts a rotational position of said gauge plate about the first axis and a rotational position of said gauge plate about the second axis.

2. The food slicer gauge plate assembly of claim 1 wherein said adjustment plate hole is threaded and said fastener is threaded into said adjustment plate hole, said fastener sized smaller than said rear plate slot to permit said fastener to move within said slot when loosened.

3. The food slicer gauge plate assembly of claim 2 wherein said first, second, third and fourth rear plate holes are threaded and said first, second, third, and fourth threaded members are threaded in said respective holes to extend therethrough and abut said adjustment plate.

4. The food slicer gauge plate assembly of claim 3 wherein said at least one adjustment plate hole comprises first and second adjustment plate holes, wherein said at least one slot comprises first and second slots, and wherein said at least one fastener comprises first and second fasteners, said first fastener positioned through said first slot and threaded within said first adjustment plate hole, and said second fastener positioned through said second slot and threaded within said second adjustment plate hole.

5. The gauge plate assembly of claim 1 wherein said adjustment plate is substantially rectangular in shape and each of said first, second, third, and fourth rear plate holes is positioned proximate to a respective corner of said adjustment plate such that each of said threaded members abuts a respective corner portion of said adjustment plate.

6. The gauge plate assembly of claim 1 further comprising:

a bottom plate to enclose said cavity, wherein said bottom plate includes a slot therein through which said indexing member extends.

7. The gauge plate assembly of claim 1 wherein said threaded members comprise set screws.

8. A food slicer gauge plate assembly adjustable in six degrees of freedom defined relative to first, second and third axes, comprising:

a gauge plate comprising a front plate and a rear plate, said rear plate attached to said front plate to form a cavity between said plates, said rear plate having at least first, second, and third holes therethrough and at least one slot therethrough;

an indexing member attached to a food slicer base;

an adjustment plate mounted to said indexing member, said adjustment plate positioned within said cavity, at least one hole formed in said adjustment plate and aligned with said rear plate slot;

at least one fastener positioned through said rear plate slot and said adjustment plate hole for securing said gauge plate to said adjustment plate when tightened and for permitting said gauge plate to move linearly along the first axis and the second axis and rotationally about the third axis when loosened;

first, second, and third threaded members threaded through said first, second, and third rear plate holes respectively and each abutting against said adjustment plate;

wherein adjustment of said threaded members adjusts a linear position of said gauge plate along the third axis and also adjusts a rotational position of said gauge plate about the first axis and a rotational position of said gauge plate about the second axis.

9. A food slicer comprising:

a base;

a rotatable blade connected to the base;

a carriage for supporting a food product as it is moved past the blade;

an indexing member connected to said base and extending upward therefrom;

an adjustment plate connected to said indexing member;

a gauge plate assembly adjustable in six degrees of freedom defined relative to first, second and third axes, said gauge plate assembly comprising:

a gauge plate including a front plate and a rear plate, said rear plate attached to said front plate to form a cavity between said plates;

wherein said adjustment plate is positioned within said cavity;

wherein one of said adjustment plate and said rear plate includes at least first, second and third holes therethrough and at least one slot therethrough, and the other of said plates includes a fourth hole therein which aligns with the slot;

a fastener positioned through said slot and said fourth hole for securing said gauge plate to said adjustment plate when tightened, and for permitting said gauge plate to move linearly along the first axis and second axis and rotationally about the third axis when loosened;

first, second, and third threaded members positioned through said first, second, and third holes in said one plate and each abutting against a portion of said other plate;

wherein adjustment of said threaded members adjusts a linear position of said gauge plate along the third axis, adjusts a rotational position of said gauge plate about the second axis, and adjusts a rotational position of said gauge plate about the first axis.

* * * * *